(12) United States Patent
Lee et al.

(10) Patent No.: US 12,394,783 B2
(45) Date of Patent: Aug. 19, 2025

(54) ANODE FOR SECONDARY BATTERY AND LITHIUM SECONDARY BATTERY INCLUDING THE SAME

(71) Applicant: SK On Co., Ltd., Seoul (KR)

(72) Inventors: Yong Seok Lee, Daejeon (KR); Jae Yun Min, Daejeon (KR); Jae Ram Kim, Daejeon (KR); Jung Hwan Kim, Daejeon (KR); Sang Won Bae, Daejeon (KR); Ji Hee Bae, Daejeon (KR); Myung Ro Lee, Daejeon (KR); Jae Yeong Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 81 days.

(21) Appl. No.: 17/569,905

(22) Filed: Jan. 6, 2022

(65) Prior Publication Data

US 2022/0310991 A1    Sep. 29, 2022

(30) Foreign Application Priority Data

Mar. 25, 2021  (KR) .......................... 10-2021-0038955

(51) Int. Cl.
*H01M 4/36*  (2006.01)
*H01M 4/133*  (2010.01)
(Continued)

(52) U.S. Cl.
CPC .......... *H01M 4/366* (2013.01); *H01M 4/133* (2013.01); *H01M 4/483* (2013.01); *H01M 4/485* (2013.01);
(Continued)

(58) Field of Classification Search
None
See application file for complete search history.

(56) References Cited

U.S. PATENT DOCUMENTS 8,808,919 B2    8/2014  Kim
2010/0021820 A1  1/2010  Ishii
(Continued)

FOREIGN PATENT DOCUMENTS

CN    103283067 A    9/2013
CN    104321912 A    1/2015
(Continued)

OTHER PUBLICATIONS

English translation of KR 2016/0087121 (Year: 2016).*

*Primary Examiner* — Yoshitoshi Takeuchi
(74) *Attorney, Agent, or Firm* — The Webb Law Firm

(57) ABSTRACT

An anode for a secondary battery includes an anode current collector, and an anode active material layer including a first anode active material layer and a second anode active material layer sequentially stacked from a surface of the anode current collector. Each of the first anode active material layer and the second anode active material layer includes a carbon-based active material and a silicon-based active material as an anode active material, and a carbon nanotube as a conductive material. A content of the silicon-based active material in the second anode active material layer is greater than a content of the silicon-based active material in the first anode active material layer. A Raman R value of the carbon nanotube included in the second anode active material layer is smaller than a Raman R value of the carbon nanotube included in the first anode active material layer.

11 Claims, 2 Drawing Sheets

(51) Int. Cl.
  *H01M 4/48* (2010.01)
  *H01M 4/485* (2010.01)
  *H01M 4/587* (2010.01)
  *H01M 4/62* (2006.01)
  *H01M 10/0525* (2010.01)

(52) U.S. Cl.
  CPC .......... *H01M 4/587* (2013.01); *H01M 4/625* (2013.01); *H01M 10/0525* (2013.01)

(56) References Cited

U.S. PATENT DOCUMENTS

| | | | |
|---|---|---|---|
| 2010/0193731 A1* | 8/2010 | Lee | H01M 4/485 977/932 |
| 2011/0123866 A1* | 5/2011 | Pan | H01M 4/525 427/458 |
| 2019/0123356 A1 | 4/2019 | Ko et al. | |
| 2019/0198879 A1* | 6/2019 | Nagai | H01M 4/131 |
| 2020/0038168 A1 | 2/2020 | Noishiki | |
| 2020/0403231 A1* | 12/2020 | Kim | H01M 4/133 |
| 2021/0119200 A1 | 4/2021 | Nam | |
| 2021/0391572 A1* | 12/2021 | Zeng | H01M 10/054 |

FOREIGN PATENT DOCUMENTS

| | | | | |
|---|---|---|---|---|
| CN | 106560940 A | | 4/2017 | |
| CN | 110249459 A | | 9/2019 | |
| CN | 110915033 A | | 3/2020 | |
| CN | 112018328 A | | 12/2020 | |
| CN | 112234163 A | | 1/2021 | |
| CN | 112467079 A | | 3/2021 | |
| JP | 2016186912 A | | 10/2016 | |
| KR | 101057162 B1 | | 8/2011 | |
| KR | 1020150121694 A | | 10/2015 | |
| KR | 2016/0087121 | * | 7/2016 | ......... H01M 10/052 |
| KR | 1020190064480 A | | 6/2019 | |
| KR | 1020190093174 A | | 8/2019 | |
| KR | 1020200038168 A | | 4/2020 | |
| KR | 1020200132749 A | | 11/2020 | |
| KR | 1020220133624 A | | 10/2022 | |
| WO | WO 2020/177624 | * | 9/2020 | ............. H01M 4/48 |

* cited by examiner

ANODE FOR SECONDARY BATTERY AND LITHIUM SECONDARY BATTERY INCLUDING THE SAME

CROSS-REFERENCE TO RELATED APPLICATION

This application claims priority to Korean Patent Application No. 10-2021-0038955 filed Mar. 25, 2021, the disclosure of which is hereby incorporated by reference in its entirety.

BACKGROUND OF THE INVENTION

1. Field of the Invention

The present invention relates to an anode for a secondary battery and a lithium secondary battery including the same. More particularly, the present invention relates to an anode for a secondary battery including a multi-layered anode active material layer, and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode, a separation layer (separator), and an electrolyte immersing the electrode assembly. The lithium secondary battery may further include an outer case having, e.g., a pouch shape.

A graphite-based material may be used as an active material of the anode. However, as demands for the lithium secondary battery of high capacity/high power has recently increased, an introduction of a silicon-based material as the anode active material is considered.

However, the silicon-based material may cause a contraction/expansion of the battery while repeating charge and discharge to result in a peel-off of an anode active material layer and a side reaction with the electrolyte. Further, mechanical and chemical defects may occur during high-temperature storage or high-temperature operation, thereby deteriorating life-span properties of the secondary battery.

Thus, an anode construction capable of providing improved charging efficiency while obtaining sufficient life-span and operational stability is needed.

For example, Korean Registered Patent Publication No. 10-1057162 discloses a metal-carbon composite anode active material for improving cycle properties.

SUMMARY OF THE INVENTION

According to an aspect of the present invention, there is provided an anode for a secondary battery having improved charging property and stability.

According to an aspect of the present invention, there is provided a lithium secondary battery including an anode with improved charging property and stability.

According to exemplary embodiments, an anode for a secondary battery includes an anode current collector, and an anode active material layer including a first anode active material layer and a second anode active material layer sequentially stacked from a surface of the anode current collector. Each of the first anode active material layer and the second anode active material layer includes a carbon-based active material and a silicon-based active material as an anode active material, and a carbon nanotube as a conductive material. A content of the silicon-based active material in the second anode active material layer is greater than a content of the silicon-based active material in the first anode active material layer. A Raman R value of the carbon nanotube included in the second anode active material layer is smaller than a Raman R value of the carbon nanotube included in the first anode active material layer. The Raman R value is defined as a ratio ($I_D/I_G$) of an intensity ($I_D$) of a D band and an intensity of a G band ($I_G$) in a Raman spectrum obtained by a Raman spectroscopy.

In some embodiments, the content of the silicon-based active material in the second anode active material layer may be from 5 wt % to 15 wt %.

In some embodiments, the content of the silicon-based active material in the first anode active material layer may be from 1 wt % to 5 wt %.

In some embodiments, the Raman R value of the carbon nanotube included in the second anode active material layer may be less than 0.5.

In some embodiments, the Raman R value of the carbon nanotube included in the second anode active material layer may be from 0.01 to 0.1.

In some embodiments, the Raman R value of the carbon nanotube included in the first anode active material layer is greater than 0.1, and less than or equal to 1.8.

In some embodiments, the Raman R value of the carbon nanotube included in the first anode active material layer may be from 0.12 to 1.4.

In some embodiments, the first anode active material layer may be in contact with the surface of the anode current collector, and the second anode active material layer may be in contact with a top surface of the first anode active material layer.

In some embodiments, the carbon nanotube included in the second anode active material layer may include a single-walled carbon nanotube (SWCNT).

In some embodiments, the carbon nanotube included in the first anode active material layer may include a multi-wall carbon nanotube (MWCNT).

In some embodiments, the silicon-based active material may include silicon (Si), a silicon alloy, SiOx (0<x<2), and/or a SiOx (0<x<2) compound containing lithium or magnesium.

In some embodiments, the carbon-based active material may include artificial graphite.

In some embodiments, the carbon-based active material may further include natural graphite, and a content of artificial graphite in the carbon-based active material is greater than a content of natural graphite.

According to exemplary embodiments, a lithium secondary battery includes an anode for a secondary battery according to embodiments as described above, and a cathode facing the anode and including a lithium-transition metal composite oxide.

According to exemplary embodiments of the present invention, a silicon-based active material may be applied to an entire anode active material, and a content of the silicone-based active material may be increased in an upper anode active material layer spaced apart from a surface of an anode current collector. Accordingly, lithiation may be promoted from the surface of the anode, and high capacity and rapid charging properties of the silicon-based active material may be sufficiently implemented.

In exemplary embodiments, a carbon nanotube having a Raman R value within a predetermined range may be applied as a conductive material to the upper anode active material layer. Accordingly, deterioration of life-span properties and stability due to an increase of the content of the silicon-based active material in the upper anode active material layer may be prevented. Further, high temperature stability may be enhanced from the carbon nanotube having the Raman R value.

DESCRIPTION OF THE INVENTION

According to exemplary embodiments of the present invention, an anode for a secondary battery including a plurality of anode active material layers that has different compositions is provided. A lithium secondary battery including the anode is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
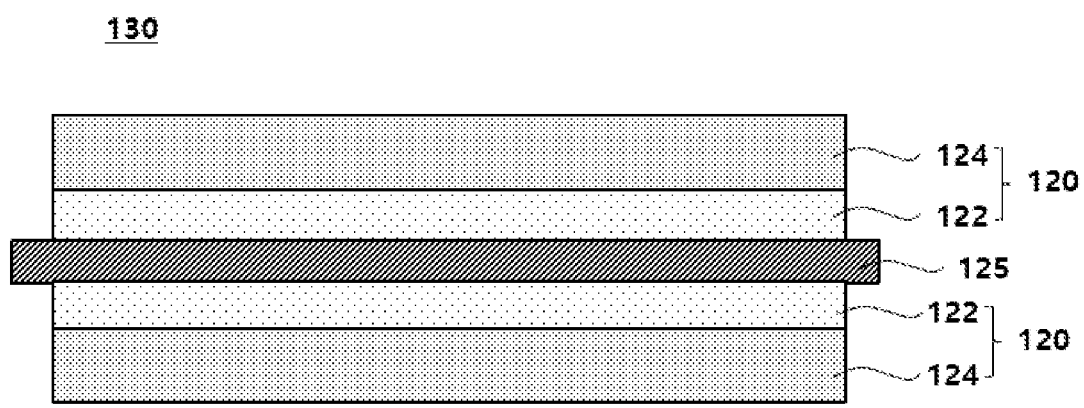
FIG. 1 is a schematic cross-sectional view illustrating an anode for a secondary battery in accordance with exemplary embodiments.

FIG. 1 is a schematic cross-sectional view illustrating an anode for a secondary battery in accordance with exemplary embodiments.

Referring to FIG. 1, an anode 130 may include an anode current collector 125, and an anode active material layer 120 formed by coating an anode active material on the anode current collector 125.

In exemplary embodiments, the anode active material layer 120 may have a multi-layered structure including a first anode active material layer 122 and a second anode active material layer 124.

The anode current collector 125 may include gold, stainless steel, nickel, aluminum, titanium, copper, or an alloy thereof, preferably may include copper or a copper alloy.

The anode active material layer 120 may be formed on at least one surface of the anode current collector 125. The anode active material layer 120 may be coated on each of upper and lower surfaces of the anode current collector 125. The anode active material layer 120 may directly contact the surface of the anode current collector 125.

In exemplary embodiments, the first anode active material layer 122 may be directly formed on the surface of the anode current collector 125. The second anode active material layer 124 may be directly formed on a surface of the first anode active material layer 122.

The first anode active material layer 122 and the second anode active material layer 124 may each include a mixture of a carbon-based active material and a silicon-based active material.

Examples of the carbon-based active material may include at least one of an artificial graphite, a natural graphite, hard carbon, soft carbon, cokes, carbon black and a fibrous carbon.

In some embodiments, the artificial graphite or the natural graphite may be used as the carbon-based active material. In an embodiment, the artificial graphite may be used as the carbon-based active material. The artificial graphite has relatively enhanced life-span properties compared to those of the natural graphite, and thus may compensate for reduction of an electrode life-span and stability of a lithium secondary batterie.

In an embodiment, a mixture of the artificial graphite and the natural graphite may be used as the carbon-based active material. In this case, a content of the artificial graphite in the mixture may be greater than a content of the natural graphite. For example, a weight ratio of the artificial graphite relative to the natural graphite in the mixture may be from 9:1 to 7:3. Within the above range, additional capacity/ power improvement through the natural graphite may be obtained while improving mechanical stability of the anode or the secondary battery from the artificial graphite.

The silicon-based active material may include silicon (Si), a silicon alloy, SiOx (0<x<2), or a SiOx (0<x<2) compound containing lithium or magnesium. For example, the SiOx compound containing lithium or magnesium may include SiOx pretreated with lithium or magnesium. For example, the SiOx compound containing lithium or magnesium compound may include lithium silicate or magnesium silicate.

In some embodiments, the silicon-based active material may include a silicon-carbon composite material. The silicon-carbon composite material may include, e.g., silicon carbide (SiC) or a silicon-carbon particle having a core-shell structure.

The first anode active material layer 122 and the second anode active material layer 124 may include a first anode active material and a second anode active material, respectively. As described above, the first anode active material and the second anode active material may include the carbon-based active material and the silicon-based active material.

In exemplary embodiments, embodiments, a content of the silicon-based active material in the second anode active material layer 124 may be greater than a content of the silicon-based active material in the first anode active material layer 122.

Accordingly, sufficient capacity properties may be provided from the second anode active material layer 124 that may be closer to a separation layer, a cathode and/or an electrolyte and may provide a substantial anode activity. Further, a lithiation may be promoted from a surface of the anode 130 so that a mobility of lithium ions may be increased, thereby improving rapid charging properties.

Additionally, the carbon-based active material may be relatively increased in the first anode active material layer 122, so that excessive contraction/expansion due to the silicon-based active material in a lower portion of the anode active material layer 120 may be suppressed. Therefore, stable life-span properties may be achieved even while high-temperature charging/discharging may be repeated.

In some embodiments, the content of the silicon-based active material in the total weight of the second anode active material layer 124 may be from about 5 weight percent (wt) to 20 wt %, preferably from about 5 wt % to 15 wt %, more preferably from about 6 wt % to 10 wt %. The content of the silicon-based active material in the total weight of the first anode active material layer 122 may be from about 1 wt % to 5 wt %, preferably from about 2 wt % to 5 wt %.

In some embodiments, the content of the silicon-based active material in the total weight of the anode active material layer 120 may be from about 5 wt % to 10 wt %, preferably from about 5 wt % to 8 wt %. Within the above range, a balance between the rapid charging properties and the life-span stability may be properly maintained.

In exemplary embodiments, each of the first anode active material layer 122 and the second anode active material layer 124 may include carbon nanotube (CNT) as a conductive material. Carbon nanotube as a linear conductive material may be used, so that conductivity in the anode active material layer 120 may be more effectively improved and the rapid charging properties may be further improved from the combination with the silicon-based active material.

Carbon nanotubes having different Raman R values may be used for the second anode active material layer 124 and the first anode active material layer 122. In exemplary embodiments, the Raman R value of the carbon nanotube included in the second anode active material layer 124 may be smaller than the Raman R value of the carbon nanotube included in the first anode active material layer 122.

The Raman R value may be defined as a ratio ($I_D/I_G$) of an intensity ($I_D$) of a D band and an intensity of a G band ($I_G$) in a Raman spectrum obtained by a Raman spectroscopy.

The intensity ($I_G$) of the G band is a peak intensity for a wavenumber region from about 1,540 $cm^{-1}$ to about 1,620 $cm^{-1}$ in the Raman spectrum, and the intensity ($I_D$) of the D band is a peak intensity for a wavenumber region from about 1,300 $cm^{-1}$ to about 1,420 $cm^{-1}$.

The G band peak is a peak commonly observed in carbon-based materials, and may appear when, e.g., carbon atoms forming a hexagonal structure exist. The D band peak may be generated due to a symmetrical vibrational mode and is not observed in a perfect lattice structure, and may appear when, e.g., the hexagonal structure is not widely developed or includes defects therein.

Accordingly, the Raman R value may be utilized as an index indicating high crystallinity and low defects.

As described above, the carbon nanotube having a relatively small Raman R value may be applied to the second anode active material layer 124 as the conductive material. Accordingly, the rapid charging properties implemented by the second anode active material layer 124 may be maintained for a long period even at a high temperature.

In an embodiment, the Raman R value of the carbon nanotube (e.g., a second carbon nanotube) included in the second anode active material layer 124 may be less than 0.5. For example, the Raman R value of the second carbon nanotube may be 0.01 or more and less than 0.5, preferably from 0.01 to 0.2, more preferably from 0.01 to 0.1.

In a preferable embodiment, a single-walled carbon nanotube (SWCNT) having the above-described Raman R value range may be used as the second carbon nanotube.

In an embodiment, a mixture of the single-walled carbon nanotube and a multi-walled carbon nanotube may be used as the second carbon nanotube, and the mixture having the aforementioned Raman R value range may be used.

In an embodiment, the Raman R value of the carbon nanotube (e.g., a first carbon nanotube) included in the first anode active material layer 122 may be greater than 0.1 and less than or equal to 1.8. In a preferable embodiment, the Raman R value of the first carbon nanotube may be from 0.12 to 1.8, preferably from 0.12 to 1.4. More preferably, the Raman R value of the first carbon nanotube may be from 0.6 to 1.4 or from 1 to 1.4.

The carbon nanotube having the Raman R value in the range as described above may be employed as the first carbon nanotube, so that a reduction of resistance and an improvement of conductivity may be more effectively implemented in the first anode active material layer 122.

In a preferable embodiment, a multi-walled carbon nanotube (MWCNT) having the above-described Raman R value range may be used as the first carbon nanotube.

In an embodiment, a mixture of a single-walled carbon nanotube and a multi-walled carbon nanotube may be used as the first carbon nanotube, and the mixture within the above-described Raman R value range may be used.

For example, the first anode active material may be stirred with a binder and a first conductive material in a solvent to prepare a first anode slurry. The first anode slurry may be applied on the anode current collector 125, dried and pressed to form the first anode active material layer 122. The first conductive material may include the first carbon nanotube having the above-described Raman R value range.

The binder may include, e.g., a styrene-butadiene rubber (SBR)-based material, and may be used together with a thickener such as carboxymethyl cellulose (CMC).

In some embodiments, a content of the first anode active material may be from about 90 wt % to 98 wt %, a content of the binder may be from about 1 wt % to 5 wt %, a content of the first conductive material may be from about 0.1 wt % to 5 wt %, and a content of the thickener may be from about 0.5 wt % to 5 wt %, based on a total solid content of the first anode slurry.

For example, the second anode active material may be stirred with a binder and a second conductive material in a solvent to prepare a second anode slurry. The second anode slurry may be coated on the first anode active material layer 122, dried and pressed to form the second anode active material layer 124. The second conductive material may include the second carbon nanotube having the aforementioned Raman R value range.

In some embodiments, the first anode slurry may be coated and dried to form a preliminary first anode active material layer. The second anode slurry may be coated on the preliminary first anode active material layer and dried to form a preliminary second anode active material layer. Thereafter, the preliminary first and second anode active material layers may be pressed together to form the anode active material layer 120 having a multi-layered structure including the first anode active material layer 122 and the second anode active material layer 124.

A binder/thickener substantially the same as or similar to the binder/thickener used in the first anode slurry may also be used in the second anode slurry.

In some embodiments, the first conductive material and/or the second conductive material may further include a carbon-based conductive material other than the carbon nanotube. For example, the carbon-based conductive material may include graphene, carbon black, acetylene black, Ketjen black, Super P, hard carbon, or the like.

In some embodiments, a content of the second anode active material may be from about 90 wt % to 98 wt % by weight, a content of the binder may be from about 1 wt % to 5 wt %, a content of the second conductive material may be from about 0.1 wt % to 5 wt %, and a content of the thickener may be from about 0.5 wt % to 5% by weight based on a total solid content of the second anode slurry.

In some embodiments, a thickness of the second anode active material layer 124 may be 10% to 90% of a total thickness of the anode active material layer 120.

In an embodiment, the thickness of the second anode active material layer 124 may be greater than or equal to a thickness of the first anode active material layer 122. In an embodiment, the thickness of the second anode active material layer 124 may be smaller than the thickness of the first anode active material layer 122.

In an embodiment, the thickness of the second anode active material layer 124 may be 30% to 50% of the total thickness of the anode active material layer 120.

Within the above range, sufficient capacity through the second anode active material layer 124 may be obtained without excessive degradation of life-span/stability.

According to the above-described exemplary embodiments, a relatively high content of the silicon-based active material may be applied to the second anode active material layer 124 spaced apart from the surface of the anode current collector 125 to promote lithiation from the surface of the anode 130. Thus, high capacity and rapid charging properties of the silicon-based active material may be sufficiently implemented.

Further, the first anode active material layer 122 adjacent to the anode current collector 125 may include the relatively stable graphite-based active material (e.g., artificial graphite) in a high content to reduce contraction/expansion of the anode active material layer 120 and to improve high-temperature stability.

Additionally, the carbon nanotubes having different Raman R values may be applied to the first anode active material layer 122 and the second anode active material layer 124 in consideration of properties of each of the above-described anode active material layers. Accordingly, high capacity/rapid charging properties and high temperature storage properties may be balanced throughout the entire cathode 130.

Figure 2:
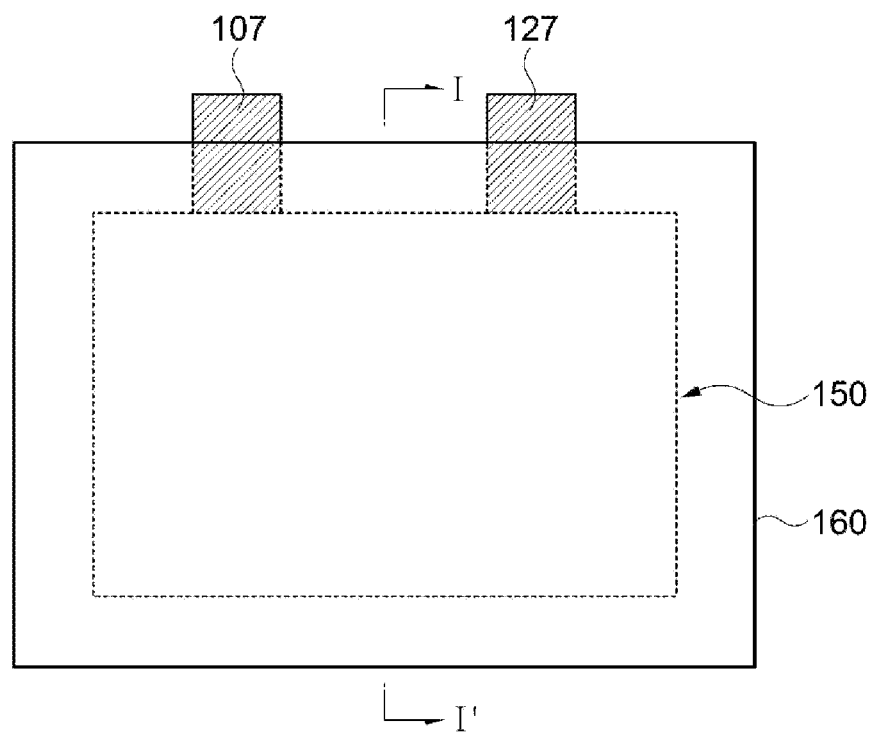
FIGS. 2 and 3 are a schematic top planar view and a schematic cross-sectional view, respectively, illustrating a lithium secondary battery in accordance with exemplary embodiments.
Figure 3:
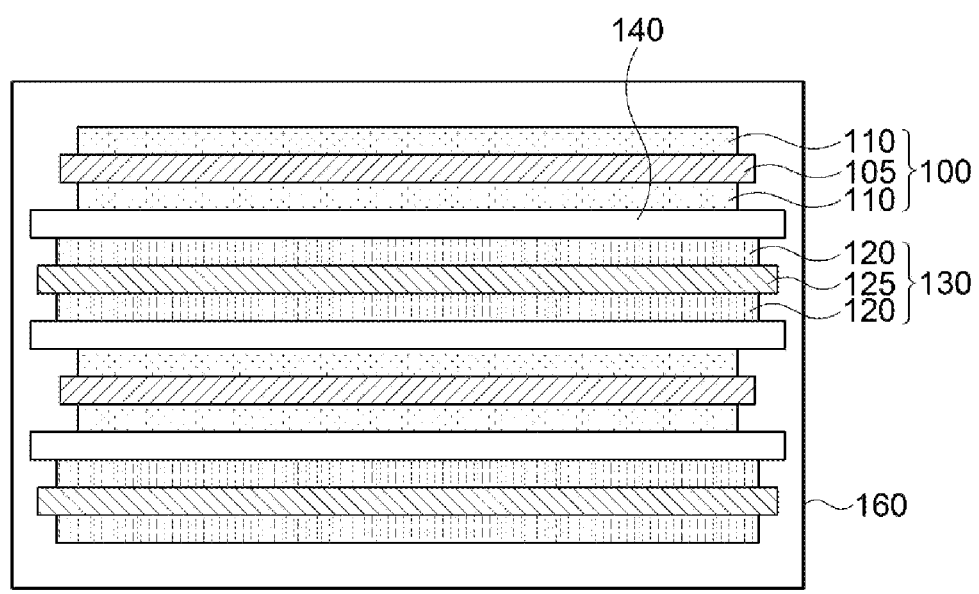

FIGS. 2 and 3 are a schematic top planar view and a schematic cross-sectional view, respectively, illustrating a lithium secondary battery in accordance with exemplary embodiments.

Referring to FIGS. 2 and 3, the lithium secondary battery may include a cathode 100 and an anode 130, and may further include a separation layer 140 interposed between the cathode 100 and the anode 130.

The cathode 100 may include a cathode active material layer 110 formed by coating a cathode active material on a cathode current collector 105. The cathode active material may include a compound capable of reversibly intercalating and de-intercalating lithium ions.

In exemplary embodiments, the cathode active material may include lithium-transition metal composite oxide particles. For example, the lithium-transition metal composite oxide particle may include nickel (Ni), and may include at least one of cobalt (Co) and manganese (Mn).

For example, the lithium-transition metal composite oxide particle may be represented by Formula 1 below.

$Li_xNi_{1-y}M_yO_{2+z}$ 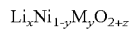 [Chemical Formula 1]

In Chemical Formula 1, 0.9≤x≤1.2, 0≤y≤0.7, and −0.1≤z≤0.1. M may be at least one element from Na, Mg, Ca, Y, Ti, Zr, Hf, V, Nb, Ta, Cr, Mo, W, Mn, Co, Fe, Cu, Ag, Zn, B, Al, Ga, C, Si and Sn.

In some embodiments, a molar ratio or concentration (1−y) of Ni in Chemical Formula 1 may be 0.8 or more, and may exceed 0.8 in a preferable embodiment.

Ni may serve as a transition metal related to power and capacity of the lithium secondary battery. Thus, as described above, the high-Ni composition may be employed in the lithium-transition metal composite oxide particle so that the cathode and the lithium secondary battery having high capacity may be provided.

However, as the content of Ni increases, long-term storage stability and life-span stability of the cathode or the secondary battery may be relatively deteriorated. However, according to exemplary embodiments, life-span stability and capacity retention may be improved by using Mn while maintaining electrical conductivity and power by including Co.

In some embodiments, the cathode active material or the lithium-transition metal composite oxide particle may further include a coating element or a doping element. For example, the coating element or the doping element may include Al, Ti, Ba, Zr, Si, B, Mg, P, W, V, an alloy thereof or an oxide thereof. These may be used alone or in a combination therefrom. The cathode active material particle may be passivated by the coating or doping element, so that stability with respect to a penetration by an external object may be further improved to increase the life-span of the battery.

A mixture may be prepared by mixing and stirring the cathode active material in a solvent with a binder, a conductive material and/or a dispersive agent. The mixture may be coated on the cathode current collector 105, and then dried and pressed to form the cathode 100.

The cathode current collector 105 may include stainless-steel, nickel, aluminum, titanium, copper or an alloy thereof. Preferably, aluminum or an alloy thereof may be used. The cathode current collector 105 may be surface-treated using carbon, nickel, titan, silver, etc.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

As described with reference to FIG. 1, the anode 130 may include the anode current collector 125 and the anode active material layer 120 having a multi-layered structure. For convenience of descriptions, detailed illustration of the first anode active material layer 122 and the second anode active material layer 124 is omitted in FIG. 3.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation.

In exemplary embodiments, an electrode cell may be defined by the cathode 100, the anode 130 and the separation layer 140, and a plurality of the electrode cells may be stacked to form an electrode assembly 150 that may have e.g., a jelly roll shape. For example, the electrode assembly 150 may be formed by winding, laminating or folding the separation layer 140.

The electrode assembly 150 may be accommodated together with an electrolyte in the case 160 to define a lithium secondary battery. In exemplary embodiments, a non-aqueous electrolyte may be used as the electrolyte.

For example, the non-aqueous electrolyte may include a lithium salt and an organic solvent. The lithium salt commonly used in the electrolyte for the lithium secondary battery may be used, and may be represented by $Li^+X^-$.

An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 2, electrode tabs (a cathode tab and an anode tab) may protrude from the cathode current collector 105 and the anode electrode current collector 125 included in each electrode cell to one side of the case 160. The electrode tabs may be welded together with the one side of the case 160 to form an electrode lead (a cathode lead 107 and an anode 127) extending or exposed to an outside of the case 160.

In FIG. 2, the cathode lead 107 and the anode lead 127 are illustrated to protrude from an upper side of the case 160 in a planar view, but the positions of the electrode leads are not limited as illustrated in FIG. 2. For example, the electrode leads may protrude from at least one of both lateral sides of the case 160, or may protrude from a lower side of the case 160. Alternatively, the cathode lead 107 and the anode lead 127 may be formed to protrude from different sides of the case 160 from each other.

The lithium secondary battery may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Examples and Comparative Examples

1) Fabrication of Anode 2 parts by weight of SBR/CMC binder and 0.5 parts by weight of CNT as a conductive material were commonly used for a first anode slurry and a second anode slurry Contents (parts by weight) of SiOx (0<x<2) as a silicon-based active material included in the first anode slurry and the second anode slurry were adjusted as described in Table 1, and artificial graphite as a carbon-based active material was used as a remainder so as to form compositions of 100 parts by weight. Raman R values of CNTs used in each of Examples and Comparative Examples are as shown in Table 1.

The Raman R value ($I_D/I_G$) of the CNT was calculated by measuring a peak intensity ($I_G$) of a G band (about 1,580 cm$^{-1}$) and a peak intensity ($I_D$) of a D band (about 1,350 cm$^{-1}$). A measurement device/conditions are as follows.

i) Raman spectroscopy: inVia, Renishaw (UK)
ii) Argon ion laser light wavelength: 532 nm
iii) Exposure time: 10 seconds, integration number: 10 times 2) Preparation of Cathode and Secondary Battery Commonly in Examples and Comparative Examples, 98.08 parts by weight of an NCM-based cathode active material, 0.6 parts by weight of a carbon black conductive material, 0.12 parts by weight of a dispersive agent, 1.2 parts by weight of a PVDF binder, and NMP were mixed to prepare a cathode slurry. The cathode slurry was coated on an aluminum substrate, dried and pressed to prepare a cathode.

The cathode and the anode obtained as described above were notched with a proper size and stacked, and a separator (polyethylene, thickness: 13 μm) was interposed between the cathode and the anode to form an assembly. Each tab portion of the cathode and the anode was welded.

The welded cathode/separator/anode assembly was inserted in a pouch, and three sides of the pouch except for an electrolyte injection side were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by dissolving $LiPF_6$ in a mixed solvent of EC/EMC/DEC (25/45/30; volume ratio) to obtain 1M $LiPF_6$ solution, and then 5 wt % of fluorinated ethylene carbonate (FEC), 0.5 wt % of 1,3-propane sultone (PS) and 0.5 wt % of ethylene sulfate (ESA) were added.

Thereafter, pre-charging was performed for 48 minutes with a current (2.5 A) corresponding to 0.25 C. degassing was performed after 12 hours, and aging was performed for more than 24 hours. Further, a charging and discharging for a formation was performed (charge condition CC-CV 0.25 C 4.2V 0.05 C CUT-OFF, discharge condition CC 0.2 C 2.5V CUT-OFF).

Subsequently, a standard charging and discharging was performed (charge condition CC-CV 0.33 C 4.2V 0.1 C CUT-OFF, discharge condition CC 0.33 C 2.5V CUT-OFF).

Experimental Example (1) Evaluation on Rapid Charging Property

Rapid charging was performed for each of the secondary batteries of Examples and Comparative Examples in divided sections within a range of SOC8-80% for 20 minutes at room temperature (25° C.), and then a discharging (0.33 C, CC, SOC8% cut-off) was performed. The above-mentioned cycle was repeated, and a discharge capacity retention at 250th cycle relative to an initial discharge capacity was measured as a percentage.

(2) Evaluation on Cycle Property at High Temperature

The secondary batteries of Examples and Comparative Examples were charged at high temperature (45° C.) under conditions of constant current-constant voltage, 1/3C, SOC 96% cut-off, and left for 10 minutes. The secondary batteries of Examples and Comparative Examples were discharged under conditions of constant current 0.5 C, SOC 2% cut-off, and left for 10 minutes. The above-mentioned cycle was repeated 100 times, and a capacity retention at the 100th cycle relative to a capacity at the 1st cycle was measured as a percentage.

TABLE 1

|  | | Active Material | | | Rapid | Life-span |
|---|---|---|---|---|---|---|
|  | Layer Position | SiOx ($0 < x < 2$) | SiOx average content | CNT (Raman R value) | Charging Life-span (250th cycle) | at high temperature (100th cycle) |
| Example 1 | Second Layer | 10 | 6 | 0.01 (SWCNT) | 93.5% | 96% |
|  | First Layer | 2 |  | 1.1 (MWCNT) |  |  |
| Example 2 | Second Layer | 7 | 6 | 0.01 (SWCNT) | 93% | 95% |
|  | First Layer | 5 |  | 1.1 (MWCNT) |  |  |
| Example 3 | Second Layer | 10 | 6 | 0.1 (SWCNT) | 92% | 93% |
|  | First Layer | 2 |  | 1.1 (MWCNT) |  |  |
| Example 4 | Second Layer | 10 | 6 | 0.01 (SWCNT) | 91.5% | 91% |
|  | First Layer | 2 |  | 1.5 (MWCNT) |  |  |
| Comparative Example 1 | Second Layer | 2 | 6 | 1.1 (MWCNT) | 77% | 86% |
|  | First Layer | 10 |  | 1.1 (MWCNT) |  |  |
| Comparative Example 2 | Second Layer | 4 | 6 | 1.1 (MWCNT) | 84% | 86% |
|  | First Layer | 8 |  | 1.1 (MWCNT) |  |  |
| Comparative Example 3 | Second Layer | 5 | 6 | 1.1 (MWCNT) | 87% | 84% |
|  | First Layer | 7 |  | 1.1 (MWCNT) |  |  |
| Comparative Example 4 | Second Layer | 2 | 6 | 0.01 (SWCNT) | 79% | 87% |
|  | First Layer | 10 |  | 1.1 (MWCNT) |  |  |
| Comparative Example 5 | Second Layer | 10 | 6 | 1.1 (MWCNT) | 81% | 83% |
|  | First Layer | 2 |  | 0.01 (SWCNT) |  |  |

Referring to Table 1, in Examples where the relatively high silicon-based active material content and the carbon nanotube having a relatively small Raman R value were applied to the second anode active material layer compared to those to the first anode active material layer, enhanced rapid charging properties and high temperature capacity retentions were achieved.

What is claimed is:

1. An anode for a secondary battery, comprising:
   an anode current collector, wherein the anode current collector is a single metal layer including gold, stainless steel, nickel, aluminum, titanium, copper, or an alloy thereof; and
   an anode active material layer comprising a first anode active material layer and a second anode active material layer sequentially stacked from a surface of the anode current collector so that the first anode active material layer is disposed directly on the anode current collector and the second anode active material layer is disposed directly on a top surface of the first anode active material layer,
   wherein the first anode active material layer is a single layer,
   wherein the second anode active material layer is a single layer,
   wherein each of the first anode active material layer and the second anode active material layer comprising a carbon-based active material and a silicon-based active material as an anode active material, and a carbon nanotube as a conductive material that is physically mixed with the anode active material,
   wherein a content of the silicon-based active material in the second anode active material layer is from 6 wt % to 10 wt % and a content of the silicon-based active material in the first anode active material layer is from 1 wt % to 5 wt %, a Raman R value of the carbon nanotube comprised in the second anode active material layer is smaller than a Raman R value of the carbon nanotube comprised in the first anode active material layer, and the Raman R value is defined as a ratio ($I_D/I_G$) of an intensity ($I_D$) of a D band and an intensity of a G band ($I_G$) in a Raman spectrum obtained by a Raman spectroscopy.

2. The anode for a secondary battery according to claim 1, wherein the Raman R value of the carbon nanotube comprised in the second anode active material layer is less than 0.5.

3. The anode for a secondary battery according to claim 1, wherein the Raman R value of the carbon nanotube comprised in the second anode active material layer is from 0.01 to 0.1.

4. The anode for a secondary battery according to claim 1, wherein the Raman R value of the carbon nanotube comprised in the first anode active material layer is greater than 0.1, and less than or equal to 1.8.

5. The anode for a secondary battery according to claim 1, wherein the Raman R value of the carbon nanotube comprised in the first anode active material layer is from 0.12 to 1.4.

6. The anode for a secondary battery according to claim 1, wherein the carbon nanotube comprised in the second anode active material layer comprises a single-walled carbon nanotube (SWCNT).

7. The anode for a secondary battery according to claim 1, wherein the carbon nanotube comprised in the first anode active material layer comprises a multi-wall carbon nanotube (MWCNT).

8. The anode for a secondary battery according to claim 1, wherein the silicon-based active material comprises at least one selected from the group consisting of silicon (Si), a silicon alloy, SiOx (0<x<2), and a SiOx (0<x<2) compound containing lithium or magnesium.

9. The anode for a secondary battery according to claim 1, wherein the carbon-based active material comprises artificial graphite.

10. The anode for a secondary battery according to claim 9, wherein the carbon-based active material further comprises natural graphite, and a content of artificial graphite in the carbon-based active material is greater than a content of natural graphite.

11. A lithium secondary battery, comprising:
the anode according to claim 1; and
a cathode facing the anode and comprising a lithium-transition metal composite oxide.

* * * * *